(12) United States Patent
Millie et al.

(10) Patent No.: US 11,109,527 B2
(45) Date of Patent: Sep. 7, 2021

(54) FLOW CONTROL FOR AGRICULTURAL IMPLEMENT PNEUMATIC SYSTEM

(71) Applicant: CNH Industrial Canada, Ltd., Saskatoon (CA)

(72) Inventors: Stewart J. Millie, Saskatoon (CA); Andrew J. Williams, Warman (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 224 days.

(21) Appl. No.: 16/234,691

(22) Filed: Dec. 28, 2018

(65) Prior Publication Data

US 2020/0205337 A1 Jul. 2, 2020

(51) Int. Cl.
*A01C 7/20* (2006.01)
*G05D 7/01* (2006.01)
*A01C 7/04* (2006.01)

(52) U.S. Cl.
CPC ............... *A01C 7/20* (2013.01); *A01C 7/042* (2013.01); *G05D 7/0153* (2013.01)

(58) Field of Classification Search
CPC .. A01C 7/20; A01C 7/00; A01C 7/042; A01C 7/04; G05D 7/0153; G05D 7/0146; G05D 7/01; G05D 7/00
See application file for complete search history.

(56) References Cited

U.S. PATENT DOCUMENTS

| | | |
|---|---|---|
| 4,081,960 A | 4/1978 | Haka |
| 4,735,554 A | 4/1988 | Phillips, II |
| 5,996,516 A | 12/1999 | Benneweis et al. |
| 6,192,813 B1 | 2/2001 | Memory et al. |
| 6,296,425 B1 | 10/2001 | Memory et al. |
| 6,308,646 B1 | 10/2001 | Luxon |
| 6,644,225 B2 | 11/2003 | Keaton |
| 7,162,962 B2 | 1/2007 | Fuessel et al. |
| 7,237,495 B2 | 7/2007 | Harnetiaux |
| 7,669,538 B2 | 3/2010 | Memory et al. |
| 7,866,269 B2 | 1/2011 | Naylor et al. |
| 8,001,914 B2 | 8/2011 | Peterson et al. |
| 8,504,310 B2 | 8/2013 | Landphair et al. |
| 8,635,963 B2 | 1/2014 | Friggstad |
| 8,690,488 B2 | 4/2014 | Jagow et al. |
| 8,770,120 B2 | 7/2014 | Naylor |
| 2012/0227647 A1 | 9/2012 | Gelinske et al. |
| 2013/0013145 A1* | 1/2013 | Ernst ..................... B64D 13/06 701/36 |

(Continued)

FOREIGN PATENT DOCUMENTS

WO 2014/047735 A1 4/2014

OTHER PUBLICATIONS

"Flexi-Coil Seeding for Success", brochure taken from http://www.flexicoil.com.au, Flexi-Coil Australia, St. Marys Australia, 2013 (36 pages).

*Primary Examiner* — Christopher J. Novosad
(74) *Attorney, Agent, or Firm* — Rebecca L. Henkel; Rickard K. DeMille

(57) ABSTRACT

An agricultural air seeder planting unit incorporates control valves that split air flow and change air direction from an air supply to air distribution hoses. The air flow of the control valves is automatically adjusted pneumatically by movement of a piston in response to a total pressure for a uniform velocity air flow from each of the control valves.

5 Claims, 3 Drawing Sheets

(56) References Cited

U.S. PATENT DOCUMENTS

| | | |
|---|---|---|
| 2013/0085598 A1 | 4/2013 | Kowalchuk |
| 2014/0020609 A1 | 1/2014 | Audigie |
| 2014/0076218 A1 | 3/2014 | Liu |
| 2014/0182495 A1 | 7/2014 | Wendte et al. |

* cited by examiner

FLOW CONTROL FOR AGRICULTURAL IMPLEMENT PNEUMATIC SYSTEM

FIELD OF THE INVENTION

The present invention relates to a pneumatic control system and, more specifically, to such a system used in agricultural implements.

BACKGROUND OF THE INVENTION

Modern seeding agricultural implements provide the function of distributing bulk seeds from an onboard hopper past a metering system to a series of hoses or conduits to individual planting units that are spaced laterally on a toolbar trailing behind a tractor. Seeding units provide a furrow of appropriate depth and distribute the seeds into the furrow from the respective hoses and then cover the hole up by an additional component. In order to appropriately distribute the individual seeds through the network of hoses, a pneumatic system provides a flow of pressurized air through the hoses to the individual seeding units.

In such an implement, it is important to have uniform flow throughout the pneumatic system. In many cases the conduits are split into branches and the flow therethrough becomes even more complicated because of an effective increase in cross-sectional airflow which thus causes the decrease in velocity. The air flow performance issues are further complicated by variations in configurations and in temporary conditions such as when sectional control is engaged wherein hoses may be partially blocked by debris. All of these factors act to present the possibility of variations in velocity between the individual planting units which can have an impact on overall accuracy of the seed spacing. When planters are manufactured with ever increasing lateral widths, the problems become even more pronounced.

Accordingly, what is needed in the art is a system for providing uniform flow through the pneumatic passages in an agricultural implement and other pneumatic systems.

SUMMARY OF THE INVENTION

The invention provides control valves within a system having a plurality of pneumatic flow passages to provide uniform and preselected flow.

In one form, the disclosure is a pneumatic flow system for an agricultural implement with a source of pressurized air and a system of hoses connected to the pressurized air source for distributing air and seeds to a plurality of delivery outlets. The system of hoses has at least one junction for splitting and changing airflow direction into at least a pair of flow paths. A control valve at the junction is displaceable to vary the flow area to the pair of flow paths and a sensor detects an air pressure immediately upstream of the control valve and generates a signal to a device which displaces the control valve to a preselected flow area.

In another form, the disclosure is a pneumatic flow control system with a source of pressurized air and a tube receiving pressurized air from the pressurized air source. A control valve is interposed in the tube and has a valve element displaceable towards the pressurized air source to reduce flow area between the upstream and downstream side of the control valve. A sensor positioned on the displaceable valve element measures total pressure of the pressurized air and generates a signal which is used by a device receiving the signal for displacing the valve element to a preselected flow area.

In still another form, the disclosure an agricultural implement for planting seeds and movable in a given direction for planting seeds in a field. The row crop planter includes a frame, a seed hopper mounted on the frame, a toolbar supported by the frame and extending laterally relative to the direction of movement of the row crop planter. A plurality of planting units are mounted on and spaced from one another along the toolbar. A unit is connected to and receives material from the seed unit for metering material and conveying it in a pressurized air stream. At least one hose is connected to the metering and conveying unit for receiving material. A junction is connected to at least one hose for changing the direction of flow and having a plurality of outlets. Hoses connect a plurality of delivery outlets to a corresponding planting unit. A control valve at the junction is displaceable to vary the flow area to the plurality of delivery outlets and a sensor detects the air pressure immediately upstream of the control valve and generates a signal. A device receives the signal from the sensor for displacing the control valve to a preselected flow area.

One advantage of the disclosure is to provide a simplified yet effective control of air through the plurality of hoses in a pneumatic conveying system.

Another advantage is to ensure uniform distribution of seeds and improved accuracy in an air seeder planting unit.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

Figure 1:
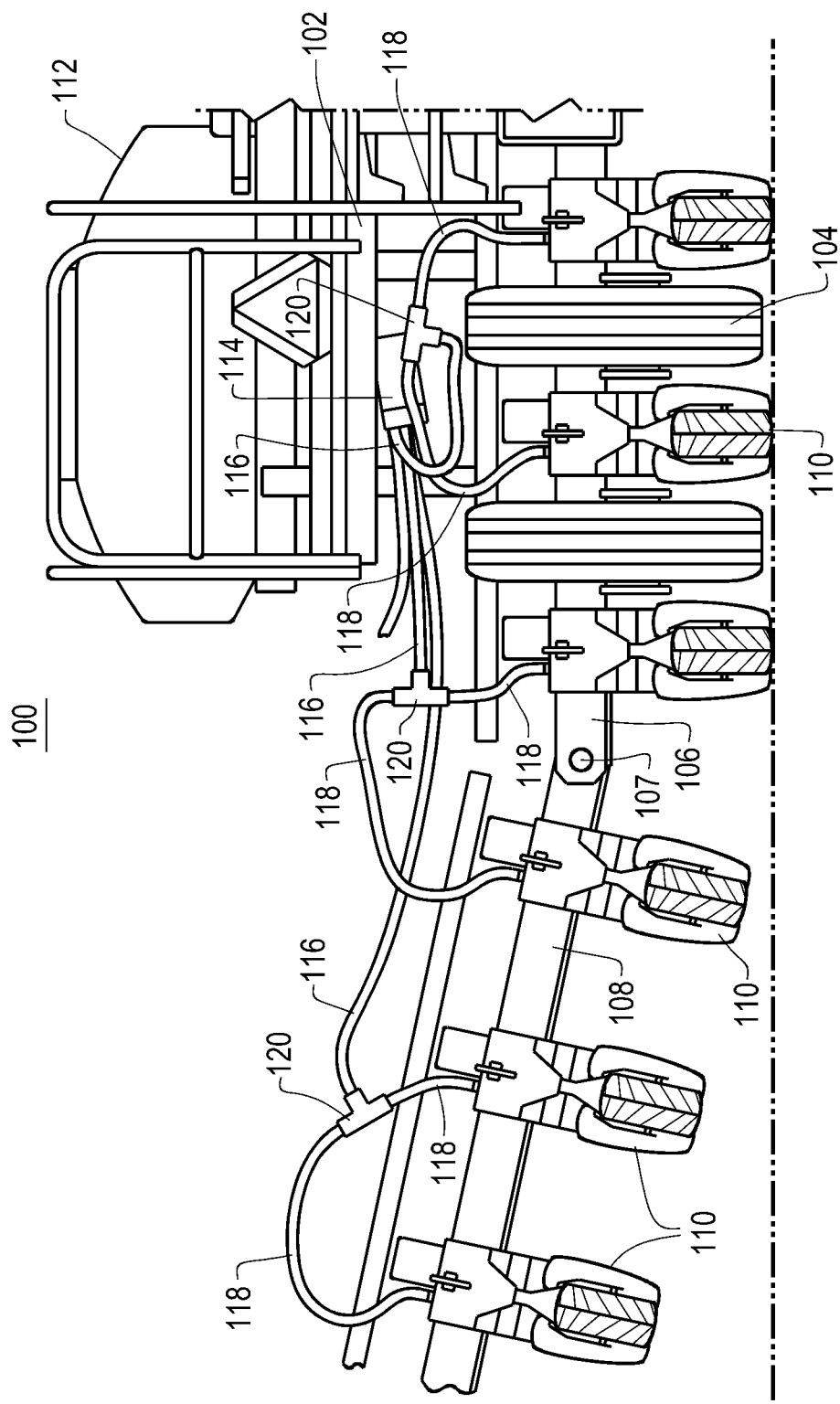
FIG. 1 shows an agricultural implement with which the present disclosure may be used.

Referring first to FIG. 1, there is shown rear view of an agricultural implement 100. The agricultural implement 100 includes a frame 102 having ground support wheels 104 for permitting mobile movement of the implement 100 over the ground in a field operation for seeding and also in a transport mode. The ground support wheels 104 are adjustable to establish an appropriate height for the implement during the planting operation and at a higher elevation during the transport between planting fields. A center tool bar 106 is mounted to frame 102 and extends transversely relative to the direction of movement, which is into the drawing in FIG. 1. Pivoting outer tool bars 108 are connected to the center tool bar by an appropriate pivotal connection 107 so that when they are extended the pivoting tool bars 108 act as a lateral extension of center tool bar 106. A plurality of planting units 110 are mounted on and spaced from one another along the center tool bar 106 and the pivoting tool bars 108. As known in the art, the planting units 110 form a trough in a field at an appropriate depth for the seeds which are then introduced in a metered fashion to the bottom of the trough. The planting units 110 also have components that cover the trough for proper seed placement. Details of the mechanism unit for the planting units 110 are not shown to enable a clear focus on the present disclosure.

A bulk seed hopper 112 is mounted on frame 102 and provides seeds in a bulk fashion. A seed metering assembly 114 receives seeds from bulk seed hopper 112 and meters them and displaces them by a utilizing a pressurized air source as is well known in the art. The details of this mechanism are not discussed to enable a clearer focus on the present disclosure. The seed metering assembly 114 distributes the seeds in an air stream and introduces them into a plurality of supply houses 116 for distribution to the planting units 110. The supply hoses 116 extend each to a control valve 120 which changes the direction of the flow and diverts it into a pair of distribution hoses 118 which in turn connect to the planting units 110 for discharge of seeds into a trough formed by the planting units 110.

Figure 2:
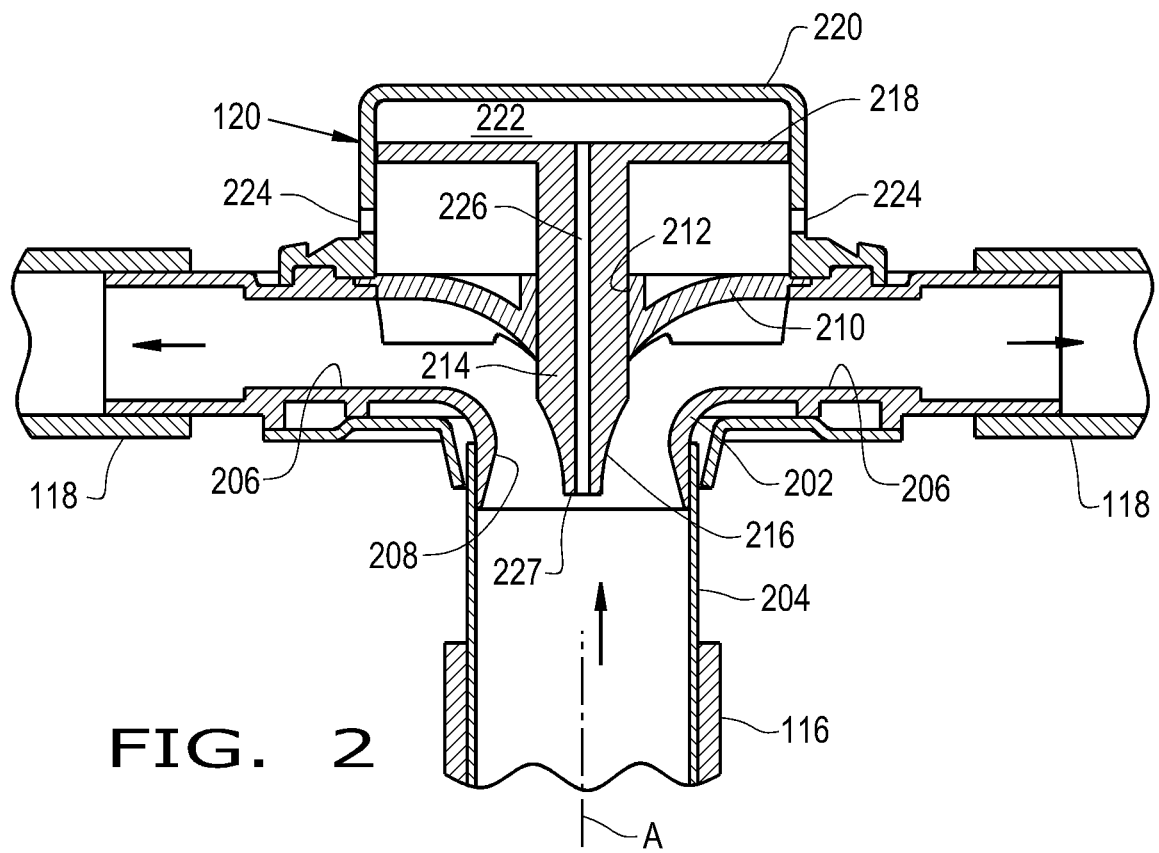
FIG. 2 is a control valve incorporated in the agricultural implement of FIG. 1.

In prior art air seeding units, the rate of flow through the various supply and distribution hoses is essential for accurate metering of the seeds at the planting units to replicate as close as possible the metering performed by the seed metering assembly 114. In practice, this becomes difficult because of the many variations in connections of the conduits, their distance from the seed metering unit, sectional controls and in local disturbances. Any such variation can cause a lack of uniformity which can impact on the metering effectiveness at the planting units 110. In accordance with the present disclosure, the control valve 120 illustrated in FIG. 2 provides a uniform distribution of flow. The control valve 120 includes a housing 202 that has an inlet 204 connected to a supply hose 116 and outlets 206 connected to distribution hoses 118. A curved annular inlet passage 208 is formed in housing 202 to provide a directional transition from the flow emanating from supply hose 116 to the distribution hoses 118. As illustrated, the transition is through 90°, however it should be apparent to those skilled in the art that the change in direction may take other forms. Housing 202 has an insert 210 which provides a smooth transition to the outlets 206 and which is generally annular in shape as viewed in the direction of axis A of the inlet 204. A through opening 212 is provided in insert 210 and receives a valve element 214 displaceable in a direction towards and away from inlet 204. Valve element 214 has a nose 216 which is curved and which aligns with the curvature of the insert 210 to provide a smooth transition of flow to the distribution hoses 118.

Valve element 214 is connected to a piston 218 displaceable in a housing 220 to provide a pressure chamber 222 on the side of the piston that is downstream from the flow entering inlet passage 208. Bleed holes 224 are provided on the housing 220 opposite to the side of piston 218 exposed to pressure chamber 222 so that ambient air may freely enter or leave that side of the housing 220. A pressure passage 226 is longitudinally provided in valve element 214 and extends from the nose 227 of valve element 214 to pressure chamber 222. As illustrated, housing 220, piston 218 and valve element 214 are shown as cylindrical in shape. The area of the piston 218 exposed to air in pressure chamber 222 is substantially larger than the area of the valve element exposed to air pressure adjacent inlet 208. Many different ratios may be provided to select the proper air flow.

In practice, air under pressure along with seeds flowing from supply hose 116 enters inlet passage 208 and the total pressure at the nose 227 of valve element 214 is applied to pressure chamber 222. The pressure sensed at the nose 227 includes the static pressure and more importantly the total pressure which reflects the energy and the velocity of air entering through inlet passage 208. If the pressure increases to a level above what is desired, the increased pressure in pressure chamber 222 causes the piston 218 to displace towards an upstream direction thus reducing the flow area past the curved inlet passage 208. As illustrated in FIG. 2, the valve element 214 is approximately at a mid position between a condition where the valve element 214 is retracted providing a maximum flow area and a condition where it is fully extended providing a minimum flow area. The valve element 214 then is displaced to a point that restricts flow thus decreasing the total pressure and allowing the piston 218 to displace further into the pressure chamber 222 and thus increase flow area and flow to an appropriate level. The valve assembly 120 utilizes straight forward fluid dynamic principals to provide an automatic and preselected flow rate throughout the supply and distribution hoses of the agricultural implement 100. Whenever conditions change, the control valves 120 automatically vary the inlet area so that a uniform air flow velocity may be employed throughout the system.

The control valve 120 shown in FIG. 2 has a pair of outlet passages. It should be apparent to those skilled in the art that there may be more or less passages having a flow area and flow rate controlled. Therefor, more than two passages may be employed and in the case of FIG. 3, a single passage may be controlled. In this case, the control valve 120 is the same as in FIG. 3 except that a single outlet 303 is provided from a control valve 120 housing 306 for connection to an outlet hose 304. A supply hose 302 provides a flow of air into the control valve 120. The operation of the valve is substantially identical to that of the illustration in FIG. 2 in that pressure chamber 222 receives total pressure from supply hose 302 to displace the valve element 214 as needed to control flow area and thus the rate of flow through the outlet hose 304. The angle between the axis of supply hose 302 and outlet hose 304 is approximately 120° but can be any angle that allows clearance around the housing 220 while allowing the pressure passage 226 to sense the total pressure of air at the control valve 120 inlet.

Figure 3:
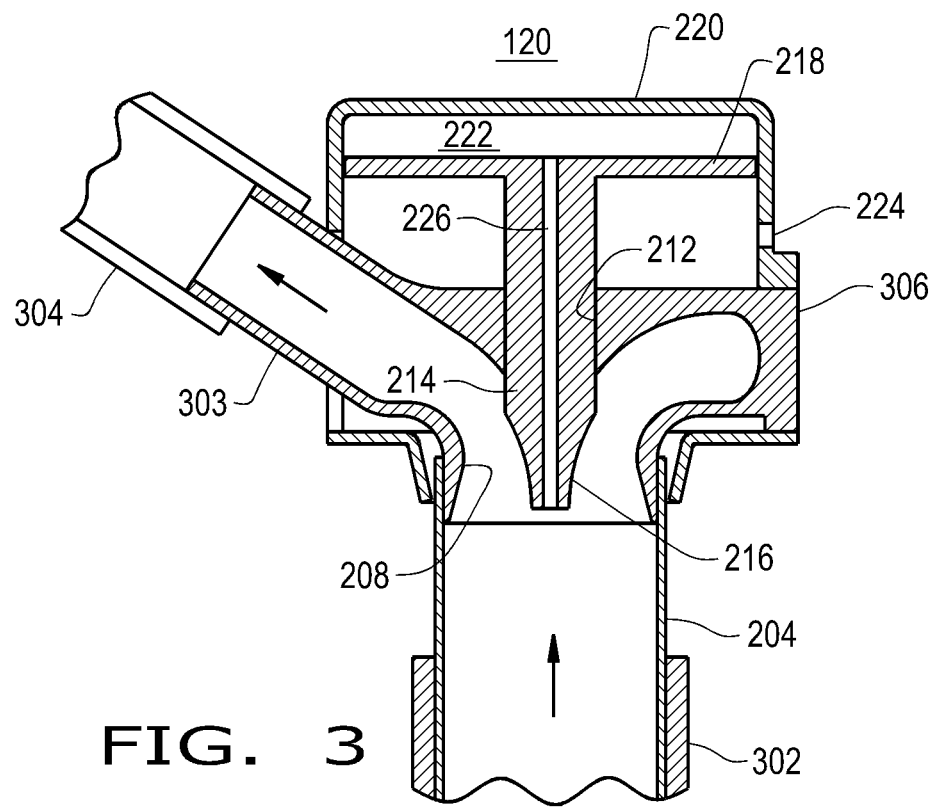
FIG. 3 is an alternative embodiment of the control valve incorporated in FIG. 1.
Figure 4:
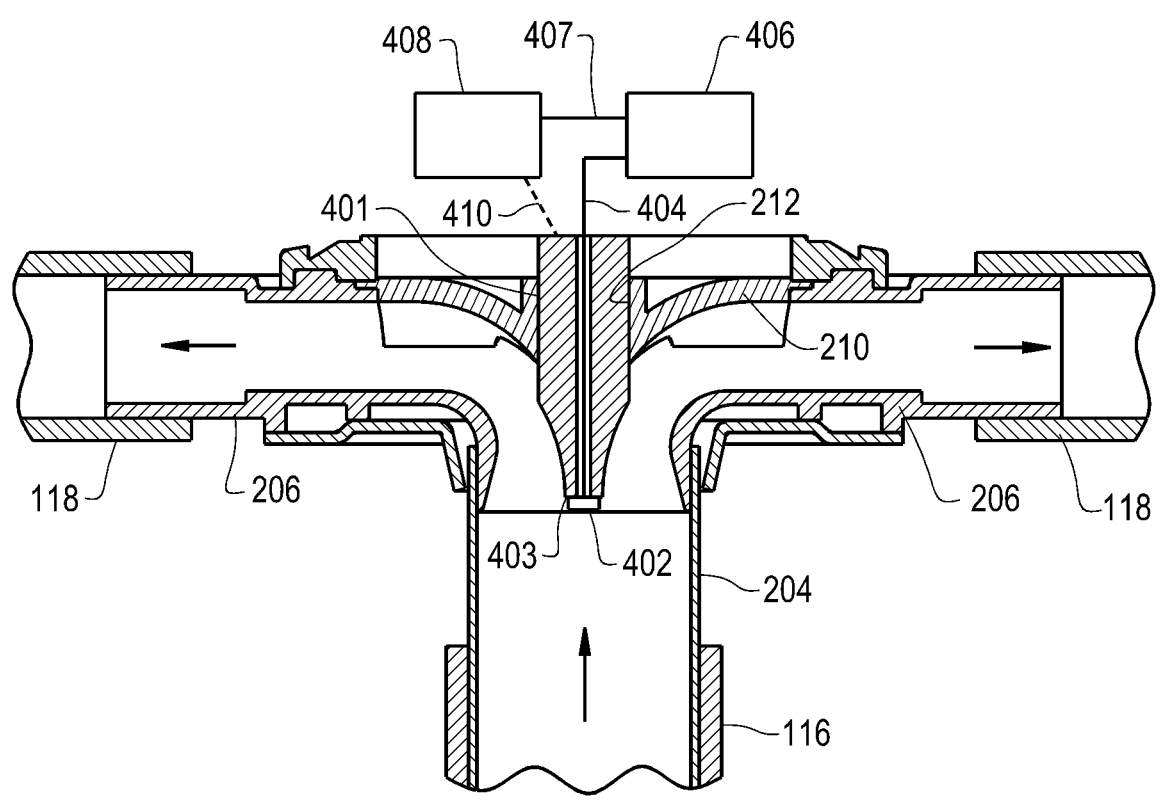
FIG. 4 is still another alternative of a control valve for use with the agricultural planter of FIG. 1.

The illustrations in FIGS. 2 and 3 show the manipulation of a control valve in purely pneumatic, mechanical fashion. The embodiment shown in FIG. 4 shows the implementation of the control valve in an electro-mechanical configuration. In this case, a valve element 401 is displaceable within opening 212 and is displaceable into the curved inlet passage 208. An appropriate pressure sensor 402 is positioned at a nose 403 of a valve element 401 or upstream in supply hose 116 to sense total pressure within the inlet passage 208. The sensor 402 generates a signal proportional to total pressure and feeds it through line 404 to a controller 406. Controller 406 utilizes the signal from sensor 402 via line 404 so that appropriate correcting signals are fed via a line 407 to an appropriate actuator 408 which displaces valve element 401 in an upstream and downstream direction through mechanical connection 410. The actual implementation of the control circuitry and mechanism is not shown to simplify the focus on the present disclosure. The valve element 401 is displaced to control flow area and thus velocity and flow rate as in the case of the control valves of FIGS. 2 and 3 in that an increase in pressure causes the valve element 401 to be displaced to reduce the flow and a decrease in pressure causes the valve element 401 to be displaced in a downstream direction to increase flow area and thus the flow rate.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A pneumatic flow system for an agricultural implement, the pneumatic flow system comprising:
 a pressurized air source;
 a system of hoses connected to the pressurized air source for distributing air to a plurality of delivery outlets, the system of hoses having at least one junction for splitting and forming a directional change of air flow into at least a pair of air flow paths to the plurality of delivery outlets;
 a control valve at the at least one junction fluidly connected to the system of hoses and displaceable to vary an air flow to the at least a pair of air flow paths to the plurality of delivery outlets, wherein the control valve comprises a housing having an inlet thereto and a valve element displaceable within the housing, the valve element positioned toward the inlet to vary the air flow from a minimum level when the valve element is fully inserted into the inlet, the valve element displaceable away from the inlet to increase the air flow, wherein the control valve housing defines an annular passage at the inlet thereof and the valve element includes an annular cross-section projecting into the annular passage, wherein the valve element has a generally conical cross-section with a tip of the valve element positioned upstream of the control valve;
 a sensor for detecting an air pressure in the system of hoses upstream of the control valve and generating a signal, wherein the sensor is positioned at least at the tip of the valve element; and,
 a device receiving the signal from the sensor for displacing the valve element to provide a preselected air flow.

2. The pneumatic flow system as claimed in claim 1, wherein the sensor detects a total air pressure upstream of the control valve.

3. The pneumatic flow system as claimed in claim 1, wherein the directional change of air flow into the at least a pair of air flow ts is approximately perpendicular to an air flow entering the control valve.

4. The pneumatic flow system as claimed in claim 1,
 wherein the device receiving a signal from the sensor comprises a cylindrical chamber having a central opening for the valve element and a piston affixed to the valve element and displaceable within the cylindrical chamber between a position in which the valve element defines a maximum air flow position through the control valve annular passage and a position in which the valve element is urged upstream to define a minimum air flow position through the control valve annular passage, and
 wherein the sensor includes a passage formed from the tip of the valve element to an end of the cylindrical chamber opposite the tip of the valve element so that an air pressure at the tip of the valve element results in displacement of the piston to decrease air flow in response to an increase in the air pressure.

5. The pneumatic flow system as claimed in claim 4, wherein the control valve housing includes curved passages from the inlet extending to the respective plurality of delivery outlets and the valve element includes a curved configuration.

\* \* \* \* \*